Feb. 20, 1940.    HANNS-HEINZ WOLFF    2,191,185

IMPULSE GENERATING ARRANGEMENT

Filed Aug. 18, 1936    3 Sheets-Sheet 1

Inventor:

Feb. 20, 1940.                HANNS-HEINZ WOLFF                2,191,185
                        IMPULSE GENERATING ARRANGEMENT
                    Filed Aug. 18, 1936          3 Sheets-Sheet 3

Inventor:

Patented Feb. 20, 1940

2,191,185

UNITED STATES PATENT OFFICE 2,191,185

IMPULSE GENERATING ARRANGEMENT

Hanns-Heinz Wolff, Berlin, Germany, assignor, by mesne assignments, to Loewe Radio, Inc., a corporation of New York Application August 18, 1936, Serial No. 96,582
In Germany August 23, 1935

6 Claims. (Cl. 250—27)

The subject matter of the invention is a method of determining automatically the passage through zero of an alternating potential. The invention also relates to the possibilities of employing and performing this method.

According to the invention the passage through zero of an alternating potential is determined by deriving impulses from the passages through zero.

The invention will be particularly described with reference to the drawings.

Figure 1:
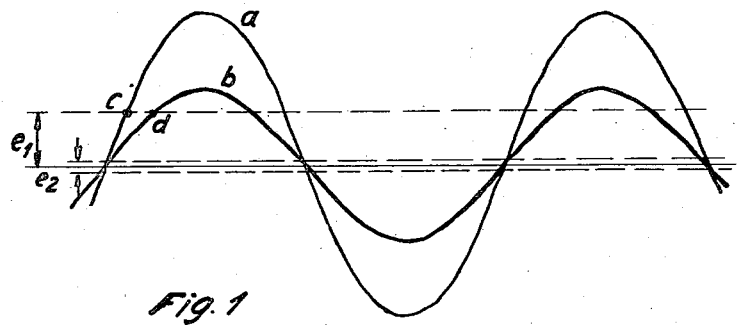
Fig. 1 illustrates the basic idea of a form of use of the method according to the invention.

The method may be employed, for example, for deriving from an alternating potential impulses which in their phase position are independent of the amplitude of the alternating potential. In Fig. 1 there are shown, for example, two sinusoidal alternating potentials $a$ and $b$ of the same frequency and phase position but of different amplitude. Methods are known of deriving impulses from alternating potentials with the aid of an arrangement which possesses a certain threshold potential, for example $e_1$ in Fig. 1, such that the alternating potential releases an impulse at the moment when the threshold value $e_1$ is traversed. As shown by the drawings, the moment of release in a method of this nature is dependent on the amplitude of the alternating potential. It is to be found, for example, at $c$ in the curve $a$ and at $d$ in the curve $b$. This defect may be remedied, for example, by displacing the curve in a manner dependent on the amplitude, for instance, in the example shown, by lowering the curve $a$ to such extent that it passes through the point $d$.

This procedure is frequently impossible owing to the delay associated therewith, and it becomes superfluous if for releasing the impulses there is employed the passage of the alternating potential through zero. The occurrence of the impulses might be made strictly independent of the amplitude of the alternating potential if it were possible to employ for the release strictly the passage through zero alone. In practice provision must be made for a small finite zone $e_2$ surrounding the passage through zero, in order that a finite releasing energy is obtained; it is possible, however, by selecting a sufficiently small value of $e_2$ always to be independent of the amplitude in practice, which is favoured by the fact that the sine curves possess their maximum steepness at their passage through zero.

Figure 2:
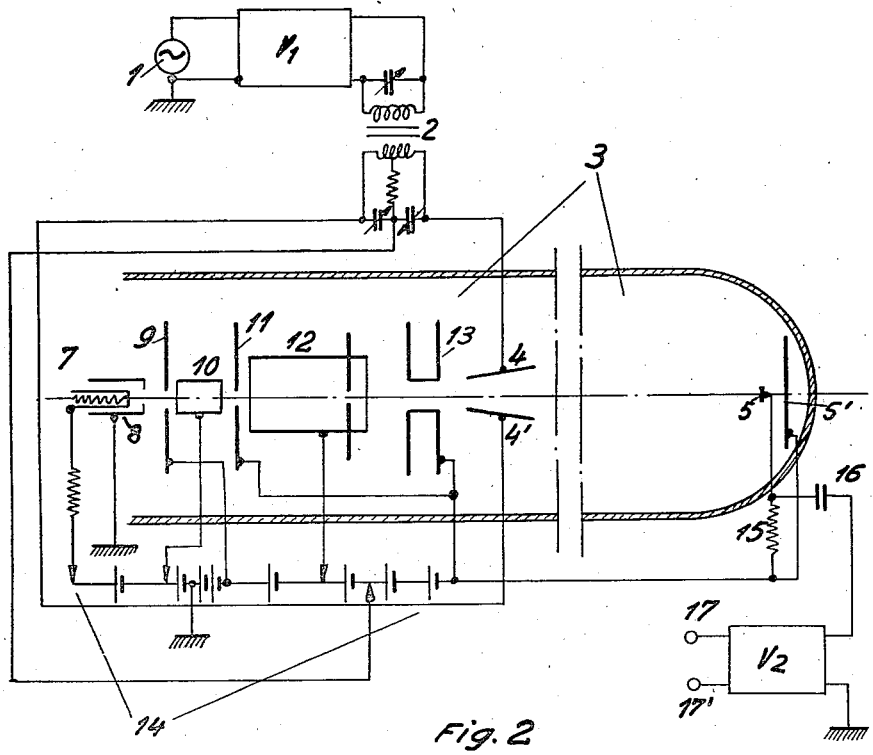
Figs. 2, 3, 4 and 5 show examples of arrangements for carrying out the method.

In Fig. 2 there is shown an arrangement in which the method according to the invention may be performed. The alternating potential is conducted to a pair of deflecting plates 4, 4' in a cathode ray tube 3, so that the cathode ray is in its stationary position and impinges on an intercepting electrode 5 when, and only when the alternating potential passes through zero. There accordingly result in the circuit of the intercepting electrode 5 impulses within certain ranges surrounding the passage of the alternating potential through zero, these ranges being the smaller the smaller the surface of the intercepting electrode 5 is and the greater its distance from the deflecting plate system 4, 4', and further the smaller the cross-section of the ray is in the plane of 5. The production of a cross-section of the ray which is as small as possible at the greatest possible distance from the deflecting plate system is an electron-optical problem such as also forms the basis of the construction of cathode ray oscillographs and television tubes. The cathode ray proceeding from the cathode 7 is collected in the plane of 5, for example by means of the concentration and reproduction systems, which are set forth in the illustrated arrangement proposed by K. Schlesinger and comprise the electrodes 8, 9, 10, 11, 12, and 13.

The cross-section of the electrode 5 is preferably made as small and the distance of this electrode from the deflecting system 4, 4' as large as will be, from the point of view of sufficient amplitude of the impulses to be obtained, considered feasible. Preferably the impulses are conducted to the consuming apparatus through an after-amplifier $V_2$, and the cross-section of 5 is made as small as the cross-section of the ray obtained in the plane of 5 with the aid of the electron-optical system.

The electrode 5' has the object of intercepting the electrons which pass the electrode 5, for the purpose of avoiding wall charges. The same in accordance with the invention may also be in the form of a wall coating. Preferably there is employed a high-vacuum cathode ray tube 3, as in the case of gas-filled tubes the cathode ray is subject to delay upon its passage through the stationary position. The circuit arrangement illustrated in Fig. 2 operates with pure sine potentials, which are conducted to the plates of the deflecting system in reverse phase. In the example shown the input alternating potential 1 is applied in reverse phase to the plates of the deflecting system 4, 4' by way of the amplifier V₁, which is preferably a resonance amplifier, and a tuned coupling system 2, for which deflecting system a suitable D. C. bias is tapped at the anode battery 14.

Of the additional references in Fig. 2, 15 and 16 are the coupling elements for the impulses, and 17 and 17' are the terminals to which the consuming apparatus is to be connected.

Naturally the arrangement may be modified in various respects without departing from the spirit of the invention. The alternating potential, the passage through zero of which is to be determined, does not require to be a sine potential, the deflecting system can be operated with the aid of circuits different from that shown, and a different circuit arrangement may be connected with the electrode 5. In the same manner the electron-optical system shown may be replaced by another type if this permits of a concentration of the ray, more particularly in a preferably flat area.

Figure 6:
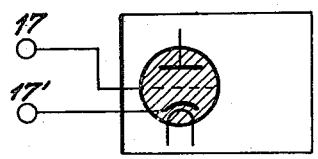
Figs. 6 and 7 show circuit details as they may be employed in the arrangement according to the invention.

It is possible by means of the impulses obtained to control a discharge tube of the thyratron type (Fig. 6), if necessary with the intermediate connection of an amplifier, as shown at V₂. This amplifier is preferably aperiodic, as it serves to amplify the impulses.

Figure 7:
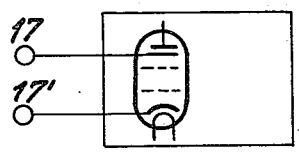

It is also possible in accordance with the operations of K. Schlesinger to replace the discharge tube of the thyratron type by a pentode, in which the impulses for controlling purposes are supplied to the intercepting grid (Fig. 7).

Figure 3:
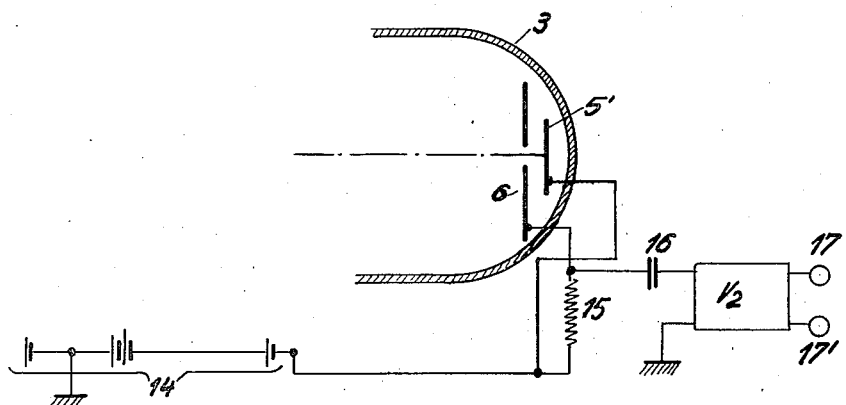

The arrangement may be employed in a large variety of forms, for example for obtaining synchronisation impulses in television arrangements both at the transmission as well as at the receiving end. In place of the electrode 5 there may also be provided a diaphragm 6, the aperture of which is made to be small from the same point of view as applies in the case of the cross-section of the intercepting electrode 5 in the form of embodiment referred to in the above. The diaphragm electrode 6 is touched by the cathode ray, except at the times when the alternating potential passes through zero. At the moment when no electrons impinge on the electrode 6 there is produced in its circuit an impulse, which is conducted to the consuming apparatus. This arrangement is illustrated in Fig. 3. The intercepting electrode 5' serves in this case to leak off the electrons which pass the diaphragm during the passages through zero.

Figure 4:
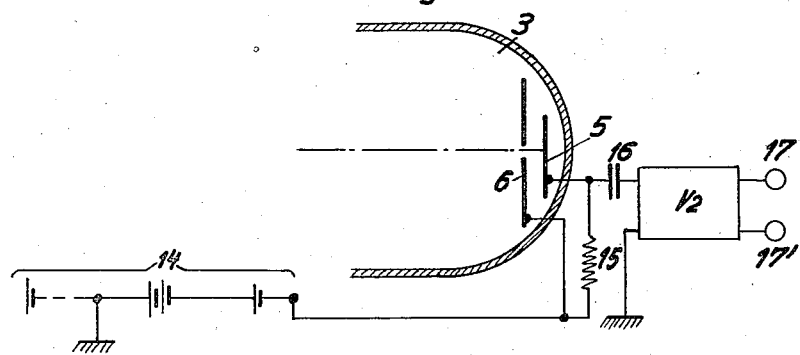

Finally, it is possible to connect the electrode 5, which is disposed behind the diaphragm 6 with the consuming apparatus (Fig. 4). This arrangement is distinguished by a particularly reliable operation, as in the case thereof any stray electrons which might still be present are intercepted by the diaphragm 6, and are, therefore, no longer able in any way to interfere with the operation of the arrangement. In this arrangement the electrode 5' shown in Figs. 2 and 3 may be omitted, as shown by Fig. 4, and further, the electrode 5 may in this case be in the form of a wall coating.

Figure 5:
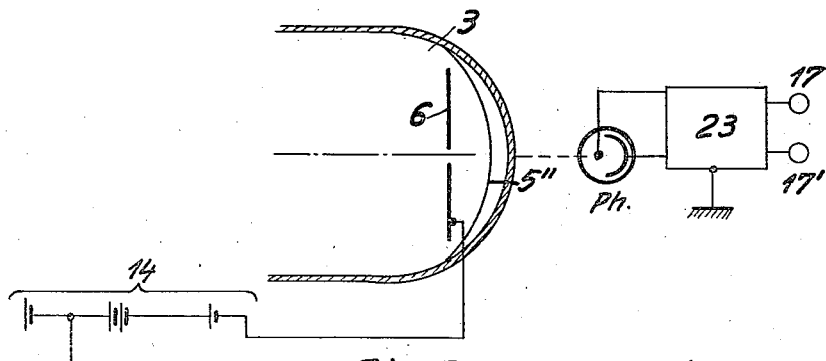

According to Fig. 5, the electronic ray allowed to pass by the diaphragm 6, instead of being electrically utilised in a direct way, may meet against a luminous screen 8'' provided on the end wall of the tube, and the light impulses thus released can produce in the photoelectrical arrangement Ph, 23, which may contain a photo-amplifier, electrical impulses, which are conducted to the consuming apparatus. In this case it is also expedient to make provision for a leaking-off of the electrons meeting against the wall.

Figure 8:
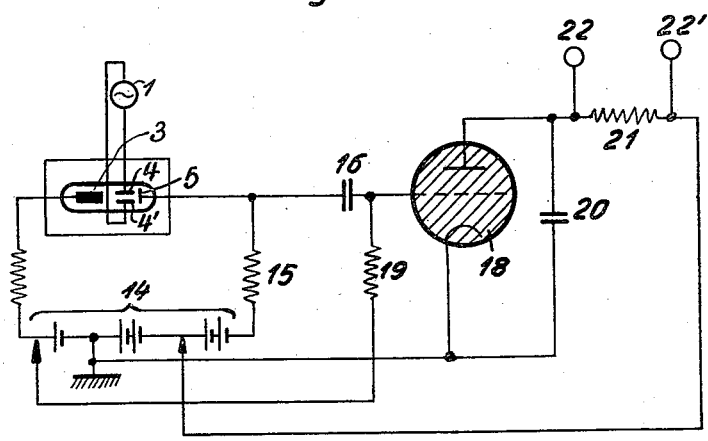
Fig. 8 shows an arrangement for carrying out a particular use of the method.

The method according to the invention may also be employed, for example, for the demodulation of frequency-modulated oscillations. An arrangement for carrying out this possible use is illustrated in Fig. 8. In the latter the references 3, 14, 15 and 16 are employed to designate the same elements as in Figs. 2, 3 and 4. 18 is a grid-controlled discharge tube of the thyratron type, 20 a condenser, which is charged through the resistance 21 by a suitable potential tapped, for example, at the battery 14. Naturally in this circuit system there may also be provided an amplifier V₂, as in Figs. 2, 3 and 4. If an impulse generated in the cathode ray tube 3 in the manner described in the above arrives at the grid of the tube 18, 18 is ignited and discharges the condenser 20, whereupon 18 again becomes non-conductive and the condenser 20 is charged anew. The dimensioning of the relaxation oscillation circuit is so chosen that the condenser 20 is always charged to the complete potential available in the period between two impulses, and that during an impulse merely one discharge is able to take place. The charging circuit (and the discharge circuit) is then traversed by a current, the mean value of which is proportional to the impulse frequency, and there may be tapped, for example, at a resistance provided in the discharge or charging circuit, for example at the charging resistance, a mean potential which is proportional to the impulse frequency (terminals 22, 22'). The basic idea of the relaxation connection system thus dimensioned has been set forth by K. Schlesinger. Naturally the circuit arrangement shown here also permits of numerous modifications; for example, also in this case the glow tube 18 may be replaced by a pentode with intercepting grid control. The use of the method according to the invention is of particular importance for the demodulation of frequency-modulated oscillations in the case of television transmissions according to the "line control" method.

I claim:

1. A device for initiating a relaxation oscillation generator by an alternating voltage at the zero point of this voltage consisting of a cathode ray tube having a pair of deflecting plates and two positive electrodes of which one is impinged upon by the ray when not deflected, the other when deflected, the circuit of the first of said electrodes being coupled to the starting electrode of said generator.

2. A device for initiating a relaxation oscillation generator by an alternating voltage at the zero point of this voltage consisting of a cathode ray tube having a pair of deflecting plates and two positive electrodes of which one is impinged upon by the ray when not deflected, the other when deflected, the circuit of the second of said electrodes being coupled to the starting electrode of said generator.

3. In a television arrangement a device for deriving synchronizing impulses from a separate alternating voltage at each passage of said voltage through zero comprising a cathode ray tube having means for producing and focussing a cathode ray, a pair of deflecting plates and two positive electrodes of which one is impinged upon by the ray when not deflected, the other when but a little deflected, and an amplifier having an input and an output, said alternating voltage being connected to said deflecting plates and one of said electrodes being coupled to said input.

4. In a television arrangement a device for deriving synchronizing impulses from a separate alternating voltage at each passage of said voltage through zero consisting of a cathode ray tube having means for producing and focussing a cathode ray, a pair of deflecting plates being connected to said alternating voltage, and two positive electrodes of which one is impinged upon by the ray when not deflected, the other when but a little deflected, said first electrode consisting of a small plate arranged in front of said second electrode, said impulses being tapped at one of said electrodes.

5. In a television arrangement a device for deriving synchronizing impulses from a separate alternating voltage at each passage of said voltage through zero consisting of a cathode ray tube having means for producing and focussing a cathode ray, a pair of deflecting plates being connected to said alternating voltage, and two positive electrodes of which one is impinged upon by the ray when not deflected, the other when but a little deflected, said first electrode being arranged behind said second electrode consisting of a large diaphragm having a small aperture, said impulses being tapped at one of said electrodes.

6. A device for demodulating a frequency modulated wave comprising a frequency modulated potential source, a relaxation oscillation generator including a gaseous discharge device having an input circuit and an output circuit, a cathode ray tube having a pair of deflecting plates to which said potential is applied, means for generating a cathode ray, and two positive electrodes of which one is impinged upon by the ray when not deflected, the other when deflected, the first of said electrodes being connected through a condenser to the input circuit of said discharge device, and a resistance in the output circuit of said discharge device the mean value of current flowing through said resistance being proportional to the frequency of said potential source.

HANNS-HEINZ WOLFF.